(12) United States Patent
Puma

(10) Patent No.: US 9,222,262 B2
(45) Date of Patent: Dec. 29, 2015

(54) DECORATIVE TILE

(71) Applicant: Joseph Christopher Puma, New York, NY (US)

(72) Inventor: Joseph Christopher Puma, New York, NY (US)

( * ) Notice: Subject to any disclaimer, the term of this patent is extended or adjusted under 35 U.S.C. 154(b) by 201 days.

(21) Appl. No.: 13/964,738

(22) Filed: Aug. 12, 2013

(65) Prior Publication Data

US 2013/0330519 A1 Dec. 12, 2013

Related U.S. Application Data

(62) Division of application No. 12/828,042, filed on Jun. 30, 2010, now Pat. No. 8,506,744.

(51) Int. Cl.
| | |
|---|---|
| *B44F 7/00* | (2006.01) |
| *B32B 38/10* | (2006.01) |
| *B32B 37/18* | (2006.01) |
| *E04C 2/54* | (2006.01) |
| *B32B 37/00* | (2006.01) |
| *B32B 37/12* | (2006.01) |
| *B29L 12/00* | (2006.01) |
| *B29C 65/14* | (2006.01) |
| *B29C 65/48* | (2006.01) |
| *B29C 65/52* | (2006.01) |
| *B29C 65/54* | (2006.01) |
| *B29C 65/00* | (2006.01) |

(52) U.S. Cl.
CPC . *E04C 2/54* (2013.01); *B29C 65/52* (2013.01); *B32B 37/0076* (2013.01); *B32B 37/1292* (2013.01); *B32B 37/185* (2013.01); *B44F 7/00* (2013.01); *B29C 65/1406* (2013.01); *B29C 65/1483* (2013.01); *B29C 65/4845* (2013.01); *B29C 65/526* (2013.01); *B29C 65/542* (2013.01); *B29C 66/24241* (2013.01); *B29C 66/24244* (2013.01); *B29C 66/322* (2013.01); *B29C 66/541* (2013.01); *B29L 2012/00* (2013.01); *B32B 38/10* (2013.01); *B32B 2419/04* (2013.01); *B32B 2451/00* (2013.01); *Y10T 156/109* (2015.01); *Y10T 156/1064* (2015.01); *Y10T 156/1082* (2015.01); *Y10T 156/1093* (2015.01); *Y10T 428/2457* (2015.01); *Y10T 428/24612* (2015.01)

(58) Field of Classification Search
CPC .............. B32B 3/02; B32B 3/36; B32B 7/12; B32B 17/00; B32B 17/064; B32B 27/30; B32B 27/308; B32B 37/0076; B32B 37/1246; B32B 37/182; B32B 37/18; B32B 38/10; B32B 2307/41; B32B 2307/314; B32B 2419/04; B32B 2419/06; B32B 2451/00; B32B 2250/02; B32B 2250/246; B32B 2307/414; Y10T 156/1064; Y10T 156/1082; Y10T 428/2457; Y10T 428/24612; B29C 65/52; B29C 65/54
See application file for complete search history.

(56) References Cited

U.S. PATENT DOCUMENTS

| | | | |
|---|---|---|---|
| 3,615,094 A | 10/1971 | Conner | 273/148 |
| 5,156,698 A | 10/1992 | Roberts | 156/108 |
| 2005/0072458 A1* | 4/2005 | Goldstein | 136/251 |

* cited by examiner

*Primary Examiner* — Linda L Gray
(74) *Attorney, Agent, or Firm* — Fish & Richardson P.C.

(57) ABSTRACT

A method includes providing a first sheet and a second sheet, wherein at least one of the first or second sheet has a portion that is transparent; forming a first groove in a first surface of the first sheet adjacent to an edge of the first sheet; applying an adhesive material to an area of the first surface of the first sheet at least partially along a length of the first groove between the first groove and the adjacent edge of the first sheet; and pressing the second sheet against the first surface of the first sheet to adhere the second sheet to the first sheet. The first groove is arranged so as to substantially prevent the adhesive material from spreading past the first groove when the second sheet is pressed against the first sheet.

2 Claims, 16 Drawing Sheets

TOP VIEW

CROSS-SECTION

DECORATIVE TILE

This application is a divisional, and claims priority, of U.S. application Ser. No. 12/828,042, filed Jun. 30, 2010. The contents of the prior application is incorporated herein by reference in its entirety.

TECHNICAL FIELD

The present invention relates to a decorative tile and a method for creating such decorative tile.

BACKGROUND

Decorative tiles can be used to cover floors, walls, ceilings, roofs, showers, tabletops, counters and the like. Decorative tiles can be used to enhance the visual appeal of rooms, furniture and the like.

They often come in a variety of designs and generally include a variety of colors and/or design elements that make them visually appealing.

SUMMARY

The details of one or more implementations of the invention are set forth in the accompanying drawings and the description below.

In one aspect, creating a decorative tile includes providing a first sheet and a second sheet, wherein the first or second sheet has a portion that is transparent. A first groove is formed in a first surface of the first sheet adjacent to an edge of the first sheet. An object is placed on the first sheet, and the sheets are pressed together. An adhesive is applied to a seam of the first and second sheets. The adhesive flows along a length of the first groove between the first groove and the adjacent edge of the first sheet, adhering the first and second sheets. The first groove is arranged so as to substantially prevent the adhesive material from spreading past the first groove when the second sheet is pressed against the first sheet.

In some implementations, the method includes arranging the second sheet relative to the first sheet such that, when the second sheet is adhered to the first sheet, an area of the first surface next to the first groove and at an opposite side of the first groove from the adhesive material is substantially visible through one or more of the transparent portions. In some implementations, the method includes arranging the second sheet relative to the first sheet such that, when the second sheet is adhered to the first sheet, the first groove and the area along the length of the first groove of the first surface to which the adhesive material has been applied are substantially visible through one or more of the transparent portions.

According to certain embodiments, the adhesive material has a substantially fluid consistency when it is applied to the area of the first surface and applying the adhesive material comprises enabling the adhesive material to flow onto the first surface.

Some embodiments include pressing the second sheet against the first surface of the first sheet before applying the adhesive material, then applying the adhesive material at a seam between the first and second sheets such that the adhesive flows along a length of the first groove between the first groove and the adjacent edge of the first sheet. In some embodiments the sheets continue to be pressed together when the adhesive material is being applied.

Certain implementations include placing an object (e.g., a decorative element) between the first and second sheets at a location such that the object is visible through one or more of the transparent portions after the first sheet is adhered to the second sheet. In some embodiments, the method includes forming a cavity in at least the first surface of the first sheet or in a surface of the second sheet that will be pressed against the first surface of first sheet; and placing the object in the cavity.

The first sheet or second sheet typically is acrylic, glass, plastic or vinyl. The first groove, in a typical implementation, has a depth between about 0.001 inches and 0.25 inches deep and a width between about 0.005 inches and 0.125 inches. Moreover, the first groove, in a typical implementation, is arranged substantially parallel to the edge of the first sheet and has a length that spans along a portion of (e.g., at least 90% of) the edge. Forming the first groove can include, for example, using a process selected from the group consisting of laser engraving, sandblasting, diamond etching, water etching, chemical etching and chiseling.

In some embodiments, the method includes applying the adhesive material only between the first groove and the adjacent edge of the first sheet.

According to certain implementations, forming the first groove includes ensuring that each portion of the first groove where the adhesive material is to be applied is between about 0.015 inches to 4 inches from the adjacent edge. The first groove, in some implementations, is arranged sufficiently near an edge of the first sheet so as to provide a sufficient adhesive area so that the first and second sheets do not substantially separate under deformation.

Certain embodiments include forming a second groove in a first surface of the second sheet, wherein the second groove is at least partially aligned with the first groove when the first sheet is adhered to the second sheet. In such embodiments, the first and second grooves typically cooperate to substantially prevent the adhesive material from spreading past the first and second grooves when the second sheet is pressed against the first sheet.

In another aspect, a method includes providing a first sheet and a second sheet, wherein at least one of the first or second sheet has a portion that is transparent; forming a first groove in a first surface of the first sheet; forming a second groove in the first surface of the first sheet adjacent to the first groove; applying an adhesive material between the first groove and the second groove; and pressing (e.g., placing in contact) the second sheet against the first surface of the first sheet to adhere the second sheet to the first sheet. The first groove and the second groove are arranged so as to substantially prevent the adhesive material from spreading past the first groove or the second groove when the second sheet is pressed against the first sheet.

In some implementations, the method includes arranging the second sheet relative to the first sheet such that, when the second sheet is adhered to the first sheet, the first groove, the second groove and an area between the first and second grooves are substantially visible through the transparent portion.

Certain implementations include creating a hole through the first or second sheet between the first and second grooves, wherein the adhesive is applied through the hole after the first and second sheets are pressed together. The adhesive material typically has a substantially fluid consistency when it is applied to the area of the first surface. Applying the adhesive material typically includes enabling the adhesive material to flow onto the first surface.

According to some embodiments, the second groove substantially follows the contours of the first groove with, in some implementations, about 0.015 inches and 4 inches between the first groove and the second groove. In some implementations, the first groove surrounds (or at least partially surrounds) the second groove.

Some implementations include placing an object between the first and second sheets at a location such that the object is visible through one or more of the transparent portions after the first sheet is adhered to the second sheet.

Each of the first and second grooves typically has a depth between about 0.001 inches and 0.25 inches deep and a width between about 0.005 inches and 0.125 inches.

In yet another aspect, a decorative tile includes a first sheet; a second sheet adhered to the first sheet, wherein the first sheet or the second sheet has a portion that is transparent; a first groove formed in a first surface of the first sheet adjacent to an edge of the first sheet; and an adhesive material between the first and second sheets along a length of the first groove between the first groove and the adjacent edge, wherein the adhesive material is a material that, when applied, has a substantially fluid consistency. The first groove is dimensioned (arranged), such that, with the substantially fluid adhesive material applied to the first surface and the first and second sheets being pressed together, the first groove substantially prevents the adhesive material from spreading past the first groove. An area of the first surface next to the first groove and at an opposite side of the first groove from the adhesive material is substantially visible through one or more of the transparent portions.

In some implementations, the first groove and an area along the length of the first groove where the adhesive material has been applied is substantially visible through one or more of the transparent portions. Moreover, the first groove typically has a depth that is between about 0.001 inches and 0.25 inches and a width that is between about 0.005 inches and 0.125 inches.

The decorative tile typically includes an object (e.g., a decorative element) between the first and second sheets and visible through one or more of the transparent portions. The decorative tile typically is a material selected from the group consisting of acrylic, glass, plastic and vinyl.

The first groove typically is arranged substantially parallel to an edge of the first sheet and has a length that spans along at least 90% of the edge.

In yet another aspect, a decorative tile includes: a first sheet; a second, sheet adhered to the first sheet, wherein the first sheet or the second sheet has a portion that is transparent; a first groove formed in a first surface of the first sheet; a second groove formed in the first surface of the first sheet adjacent to the first groove; and an adhesive material between the first and second sheets and between the first and second grooves, wherein the adhesive material is a material that, when applied, has a substantially fluid consistency. The first and second grooves are dimensioned, such that, with the substantially fluid adhesive material applied and the first and second sheets being pressed together, the first and second grooves substantially prevent the adhesive material from spreading past the first or second grooves. Moreover, areas of the first surface next to the first and second grooves and at opposite sides of the first and second groove from the adhesive material are substantially visible through one or more of the transparent portions.

In some implementations, the first groove surrounds (or substantially surrounds) the second groove.

The term "transparent" is used throughout this specification to describe, for example, transparent sheets (or transparent portions of sheets). The term "transparent" should be construed broadly so that transparent sheets, portions, materials, etc. include, for example, anything that permits the passage of at least some light, and anything that is clear, substantially clear, translucent, and/or see-through.

Other features and advantages will be apparent from the following description, the accompanying drawings, and the claims.

BRIEF DESCRIPTION OF THE DRAWINGS

FIG. 5b is a partial cross-sectional view of the decorative tile of FIG. 5a.

FIG. 8c is a top view of the decorative tile of FIG. 8a.

FIG. 8d is a partial cross-sectional view of the decorative tile of FIG. 8a.

FIG. 11b is a partial cross-sectional view of the decorative tile of FIG. 11a.

FIG. 15b is a cross-sectional view of the decorative tile of FIG. 15a.

DETAILED DESCRIPTION

FIGS. 1A-1E illustrate an exemplary method of making a decorative tile that includes two (or more) sheets adhered to one another and one or more decorative objects (e.g., gems, colored patterns, pictures, etc.) located between the sheets and visible through one or more of the sheets. In a typical implementation, the illustrated method advantageously contains the adhesive material that holds the two (or more) sheets together in one or more predetermined areas so as to avoid marring the areas that contain the one or more decorative objects. The adhesion strength between the sheets of the resulting structure typically is quite high and the area that contains the one or more decorative objects is not marred by the appearance of adhesive material and, therefore, is visually very appealing. Moreover, in a typical implementation, the adhesive material that adheres the two sheets together also seals a space that contains the decorative objects to substantially prevent contamination of the space from foreign (e.g., air-born) materials.

Figure 1A:
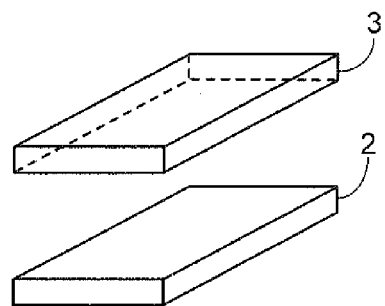
FIGS. 1A-1E are perspective views of a decorative tile at various stages of manufacture.

Referring to FIG. 1A, the method includes providing a first sheet 2 and a second sheet 3. The first and second sheets can be acrylic, glass, plastic, vinyl or any other substantially rigid material. In the illustrated embodiment, each sheet is a rectangular parallelepiped. At least a portion of the first 2 or second 3 sheet is transparent. In the illustrated implementation, the entire second sheet 3 is transparent, whereas the entire first sheet 2 is opaque. In the illustrated implementation, the first sheet 2 has approximately the same dimensions (length, width and height) as the second sheet 3.

Figure 1B:
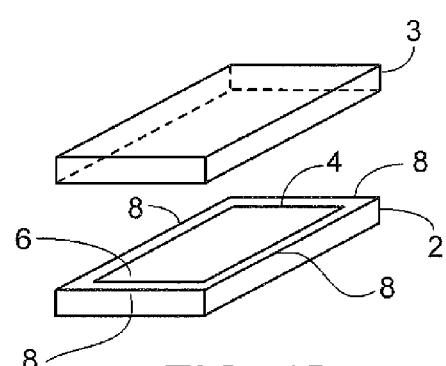
Figure 1C:
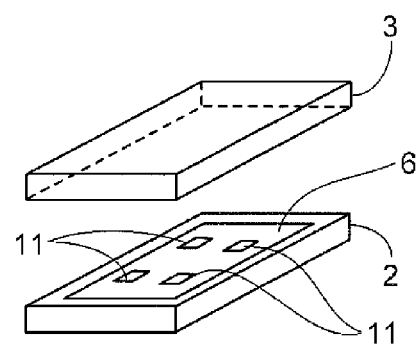
Figure 1D:
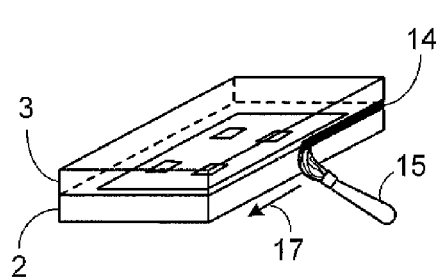
Figure 1E:
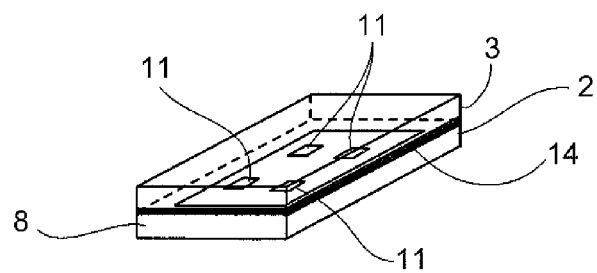

Turning now to FIG. 1E, the illustrated method includes forming a first groove 4 in a first surface 6 of the first sheet 2. The first groove 4 can be formed using any known technique for groove formation, including, for example, laser engraving, sandblasting, diamond etching, water etching, chemical etching, chiseling (i.e., using workshop tools such as table saws or routers), or the like. The first groove 4 can have a cross-sectional profile that is, for example, substantially u-shaped, substantially v-shaped, substantially flat-bottomed or any other shape. The dimensions of the first groove 4 can vary considerably. However, in a typical implementation, the first groove's depth (at its deepest part) is between about 0.001 inches and 0.25 inches and its width (at least at the top of the first groove) is between about 0.005 inches and 0.125 inches. It has been found that such dimensions provide a high degree of reliability in preventing the spread of adhesive material past the first groove 4.

In the illustrated implementation, the first groove 4 follows a substantially rectangular pattern about a perimeter of the first surface 6, with each side of the rectangular pattern being adjacent to and substantially parallel to a corresponding adjacent edge 8 of the first surface 6.

In various implementations, the distance between each side of the first groove 4 and the corresponding adjacent edge is between about 0.015 inches and 4 inches—which may depend, at least in part, on the overall size of the sheets. It may be desirable, however, to form the first groove so that each of its sides are as close as possible to the corresponding adjacent edge in order to minimize the adhesive material containment area. The distance should be sufficiently large, however, that the adhesive material containment area (i.e., the area outside the first groove) can accommodate enough adhesive material to effectively adhere the first and second sheets together. In a typical embodiment, and consistent with what is shown in FIG. 1B, the first groove defines a relatively small outer area, for the placement of adhesive material and a relatively large inner area, for the placement of decorative elements.

In FIG. 1C, four objects 11 (e.g., decorative elements) are placed on the first (i.e., upper) surface 6 of the first sheet 2—between the first 2 and second 3 sheets. These objects are located on the first surface 6 such that they will be visible through the transparent second sheet 3 after the first sheet 2 is adhered to the second sheet 3. Moreover, these decorative elements are positioned in an area of the first surface that will be isolated (by the first groove 4) from the adhesive application area (i.e., the area between the first groove 4 and the edges 8 of the first surface 6 in FIGS. 1A-1E).

In some implementations, the objects are substantially thin, flat object (such as pictures on paper); in other implementations, the objects are not substantially flat but, instead, have a relatively large dimension (e.g., 0.2 centimeters or more) in a direction extending perpendicular from the first surface 6. In some implementations, a cavity is formed in one or both of the first surface of the first sheet and the surface of the second sheet that is to be pressed against and adhered to the first surface to accommodate the objects 11 being placed therebetween. In those implementations, the object or objects are placed into the cavity.

In FIG. 1D, the first sheet 2 and the second sheet 3 are brought into contact with one another. In some implementations, the two sheets are pressed together. Once the first 2 and second 3 sheets are in contact with each other, an adhesive material 14, having a substantially fluid consistency when applied, is applied between the first 2 and second 3 sheets. In the illustrated implementation, the adhesive material is applied by brushing (with a brush 15) the adhesive material 14 along the seam between the first 2 and second 3 sheets. As the brush is moved along the seam, for example, in the direction indicated by arrow 17, adhesive material is drawn off of the brush and into the small space between the first 2 and second 3 sheets.

In a typical implementation, the adhesive material being used is a material that dries very quickly once it comes into contact with the first 2 or second 3 sheets. Applying such fast-drying adhesive material in the manner shown is particularly advantageous because the first 2 and second 3 sheets are in contact with one another (as is desired) as the adhesive material is applied.

It has been noticed that the adhesive material 14 flowing into the space between the first 2 and second 3 sheets does not flow past the first groove 4. Instead, the adhesive material is confined to the space outside of the first groove 4 (i.e., between the first groove 4 and each edge 8 of the first surface 6. The adhesive material 14 does not, however, flow into the inner area (the decorative objects area), which is bound by the first groove 4. The adhesive material does, however, flow substantially throughout the entire boundary area (i.e., the area outside first groove 4) defined by the first groove 4.

In a typical implementation, the adhesive material 14 is applied at least to an area of the first surface 6 of the first sheet 2 at least partially along a length of the first groove 4 between the first groove 4 and an adjacent edge 8 of the first sheet. As shown in FIG. 1E, in the illustrated implementation, the adhesive material 14 is applied around the entire perimeter of the first groove 4.

In some embodiments, the first 2 and second 3 sheets are pressed together while the adhesive material 14 is being applied to adhere the second sheet 3 to the first sheet 2. In general, the first groove 4 is arranged so as to substantially prevent the adhesive material 14 from spreading past the first groove 4 when (or while) the second sheet 3 is pressed against the first sheet 2.

In FIG. 1E, the second sheet 3 is arranged relative to the first sheet 2 such that, with the second sheet 3 adhered to the first sheet 2, at least an area of the first surface 6 next to the first groove and at an opposite side of the first groove 4 from the adhesive material is substantially visible through the second sheet 3. Moreover, with the second sheet 3 adhered to the first sheet 2, the first groove 4 and the area along the length of the first groove 4 of the first surface 6 to which the adhesive material 14 has been applied are substantially visible through second sheet 3.

Figure 2:
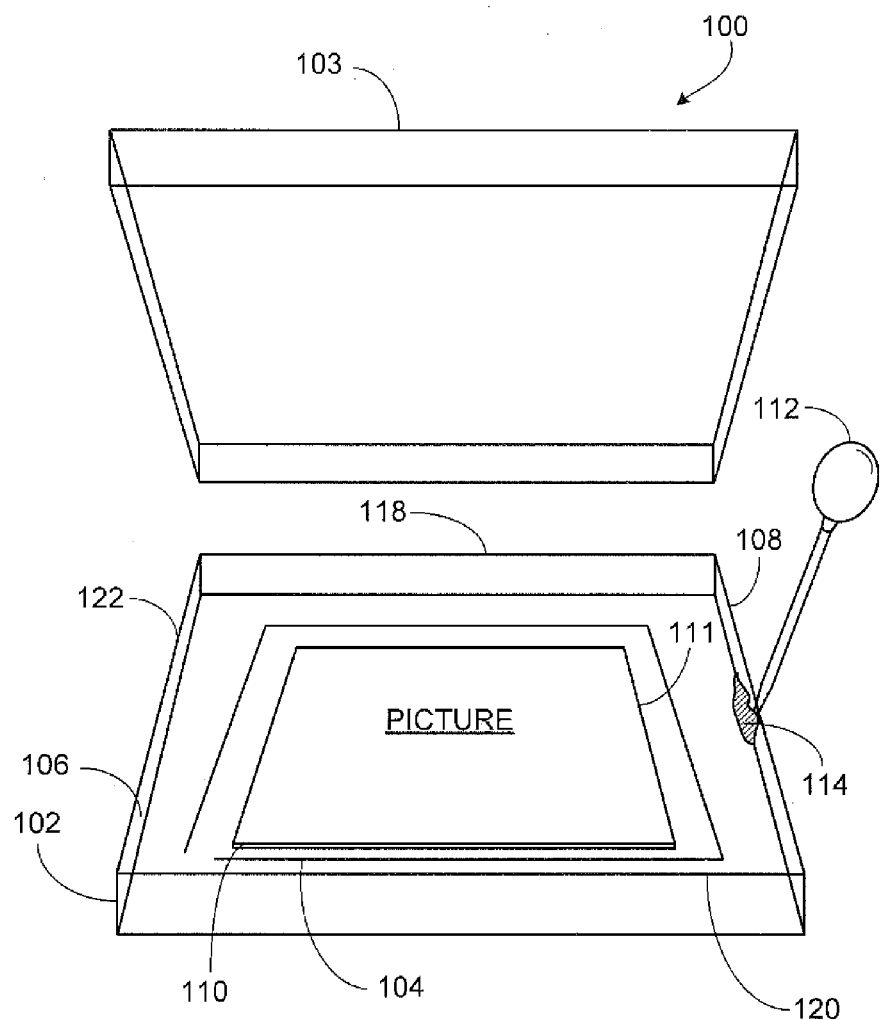
FIG. 2 is an exploded view of a decorative tile.

The series of FIGS. 2-4a and 4b illustrate another implementation for manufacturing a decorative tile 100. Referring to FIG. 2, a first sheet 102 and a second sheet 103 are provided. In this example, the sheets 102, 103 each consist of transparent acrylic.

Next a first groove 104 is formed on the first surface 106 of the first sheet 102 using a laser engraver, such as the Universal Laser Systems M-300. In this embodiment, the laser engraver forms a first groove 0.005 inches wide and 0.001 inches deep. The laser engraver is manipulated so that the first groove 104 is adjacent to an edge 108 of the first sheet 102, or approximately 0.015 inches from an edge 108. The laser engraver is further manipulated so that the first groove 104 follows the contours of the first surface 106 of the first sheet 102, forming a non-continuous loop—indicated by the gap 110. The gap 110 measures about 0.01 inches.

Then, an object 111, such as a picture, is placed on the first surface 106 of the first sheet 102. Using a syringe 112, adhesive material 114—such as methylene chloride, a colorless, liquid solvent—is applied to an area of the first surface 106 of the first sheet 102 along a length of the first groove 104 between the first groove 104 and the adjacent edge 108 of the first sheet 102.

Figure 3:
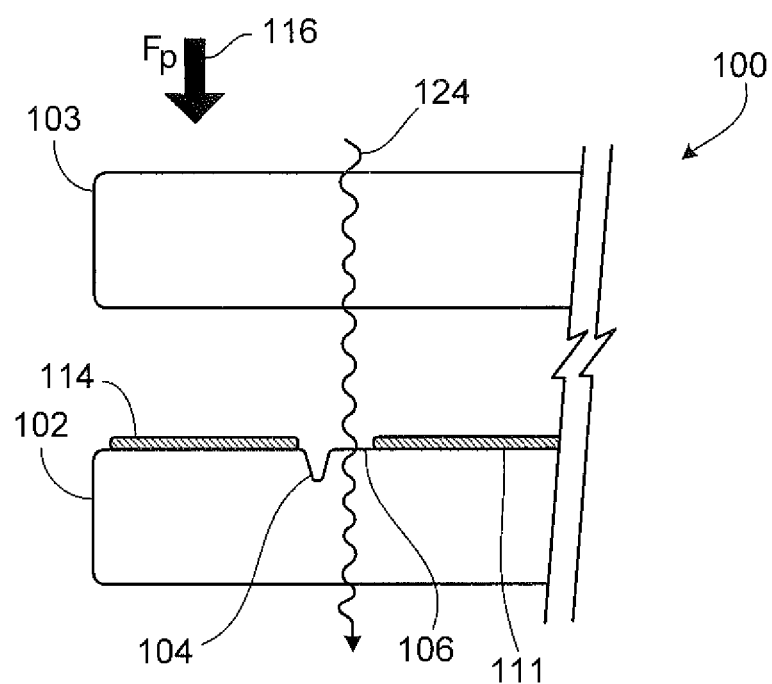
FIG. 3 is a cross-sectional view of the decorative tile shown in FIG. 2.

Now referring to FIG. 3, the second sheet 103 is pressed 116 against the first surface 106 of the first sheet 102 to adhere the second sheet 103 to the first sheet 102. Turning back to FIG. 2, when the second sheet 103 is pressed against the first sheet 102, the adhesive material 114 spreads between the first groove 104 and the edge 108. Additionally, the methylene chloride spreads by capillary action to any area where the first sheet 102 and the second sheet 103 are touching. However, the adhesive material 114 does not spread past the first groove 104 because the first sheet 102 and the second sheet 103 stop touching at the first groove 104. In other words, the adhesive material 114 does not "jump across" the first groove 104.

The adhesive material 114 spreads and fills the area between the first groove 104 and the edges 118, 120, and 122. As it spreads, the adhesive material 114 bonds the first sheet 102 and the second sheet 103—creating an airtight seal. Moreover, despite the gap 110, the adhesive material 114 is unable to substantially spread past the first groove 104. This implementation is complete as soon as the adhesive material 114 cures.

Without limiting the scope of the present disclosure, it is believed that the surface tension of the adhesive material 114 may help account for preventing the adhesive material from flowing into or beyond the first groove 104 or spreading past the gap 110.

Figure 4A:
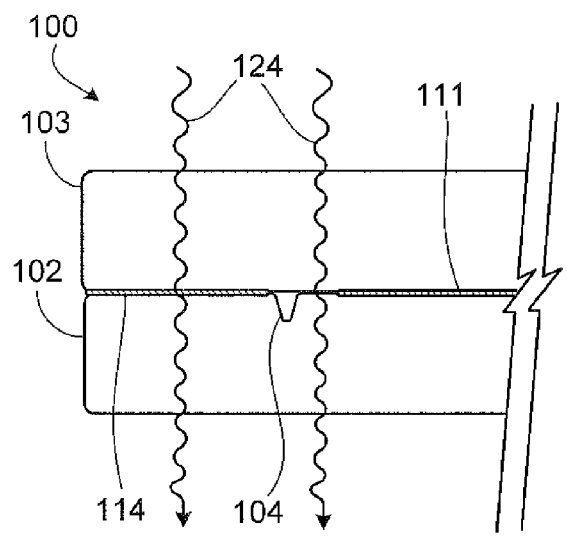
FIG. 4a is a partial cross-sectional view of a decorative tile.

Now referring to FIG. 4a, the finished decorative tile 100 allows light 124 to pass through the first sheet 102 and the second sheet 103. In other words, the decorative tile is transparent and the object 111 is visible to the naked eye. In this embodiment, the methylene chloride adhesive material 114 is transparent, allowing light 124 to pass through the area where the adhesive material 114 is applied. Moreover, in this embodiment, light 124 passes through the area of the first surface 106 between the first groove 104 and an opposite side of the first groove from the adhesive material 114, i.e., the area of the first surface 106 between the first groove 104 and the object 111.

Figure 4B:
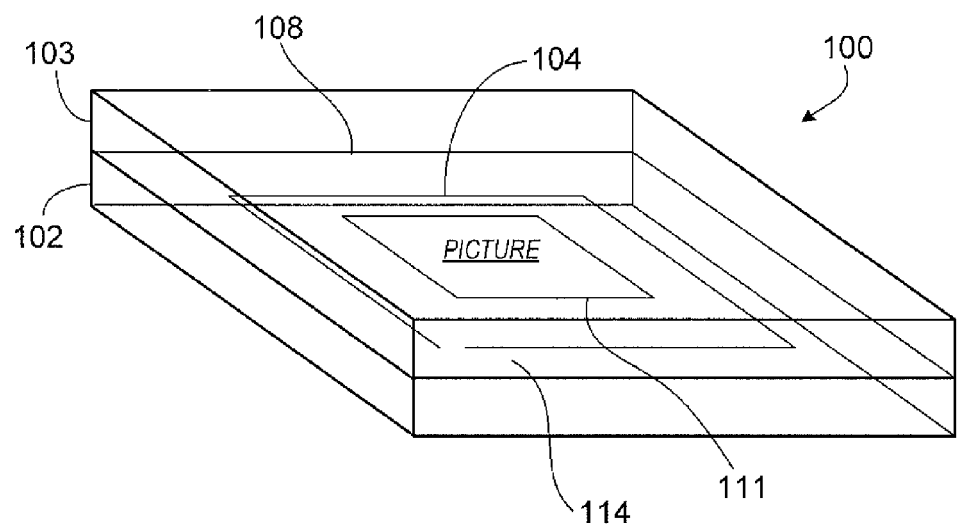
FIG. 4b is a perspective view of a decorative tile.

FIG. 4b shows a completely assembled decorative tile 100. It includes a first sheet 102 and a second sheet 103, which is adhered to the first sheet 102. In this embodiment, both the sheets 102, 103 and the adhesive material 114 are transparent, creating two transparent portions. The first transparent portion is between the first groove 104 and the object 111. The second transparent portion is between the first groove 104 and the edges 108, 118, 120, and 122. The decorative tile 100 also includes a first groove 104 formed in a first surface 106 of the first sheet 102 adjacent to an edge 108 of the first sheet 102. Here, the first groove 104 is approximately 0.015 inches away from the edge 108. And the adhesive material 114 is between the first sheet 102 and second sheet 103 along a length of the first groove 104 between the first groove 104 and the adjacent edge 108. The methylene chloride adhesive material 114 has a low viscosity and is substantially fluid when applied. Further, the first groove 104 is dimensioned, such that, with the substantially fluid adhesive material 114 applied to the first surface 106 and with the sheets 102, 103 being pressed together, the first groove 104 substantially prevents the adhesive material from spreading past the first groove 104. In other words, no adhesive material 114 is able to penetrate into the area between the first groove 104 and the object 111. Moreover, an area of the first surface 106 next to the first groove 104 and at an opposite side of the first groove 104 from the adhesive material 114 (i.e., the area between the first groove 104 and the object 111) is substantially visible through the first transparent portion. Additionally, in this example, an area along the length of the first groove 104 where the adhesive material 114 has been applied is substantially visible through the second transparent portion.

Figure 5A:
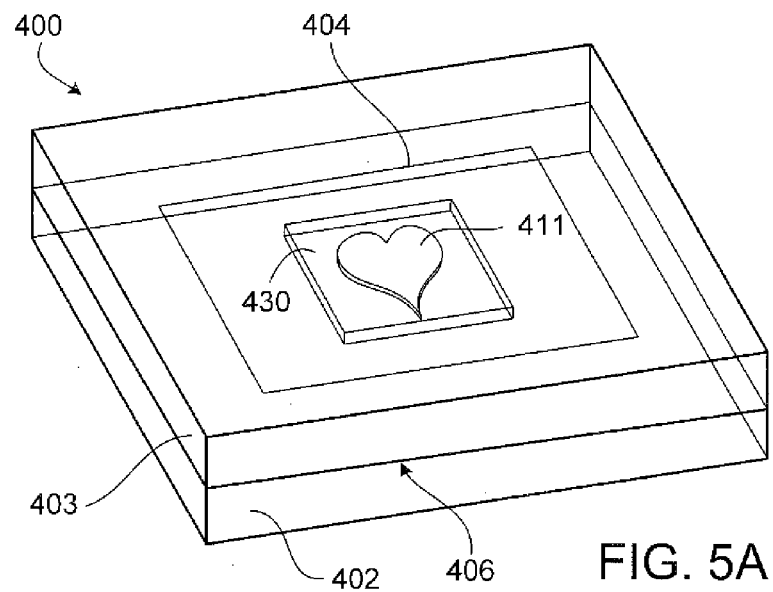
FIG. 5a is a perspective view of a decorative tile with an object placed within a cavity of the first sheet.
Figure 5B:
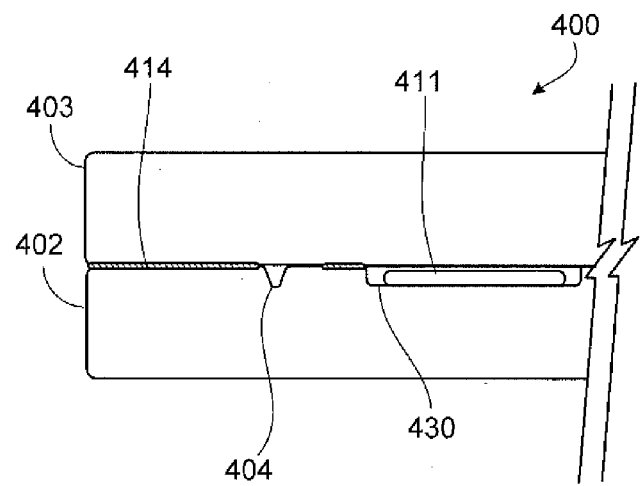

FIG. 5 shows a decorative tile 400 that is similar to the decorative tile 100 shown in FIG. 2, with some exceptions. One implementation for manufacturing the decorative tile 400 includes forming a cavity 430 in the first surface 406 of the first sheet 402. The cavity 430 may be formed by methods similar to those used for making the first groove 404, such as: laser engraving, sandblasting, diamond etching, water etching, chemical etching and chiseling. Then, an object 411 is placed in the cavity. Of course, the size (i.e., length, width, and depth) of the cavity 430 is formed so that the object 411 fits flush within the cavity 430. The object 411 in this embodiment is an ornate jewel shaped like a heart. However, it is understood that objects of many sizes, shapes, and colors fit within the cavity, including without limitation: mirrors, coins, keepsakes, heirlooms, art pieces, pictures, jewels, flowers, toys, and even liquid. Alternatively, the cavity 430 may be left empty to create an aesthetically pleasing sense of depth.

Another difference in FIG. 5 is that the first groove 404 is continuous, i.e., it is "closed" and there is no gap 110 as in FIG. 2. In some implementations, the first groove 404 is closed to allow better control the flow of the adhesive material 414, so as to prevent the adhesive material 414 from spreading past the first groove 404, i.e., the area between the first groove 404 and the cavity 430. This disclosure uses the word "continuous" broadly. For instance, a first groove containing small interruptions (e.g., less than about 0.01 inches) should still be "continuous" for the purposes of this invention.

The spirit of this implementation is to display such objects, alone or in combination with more objects, in a protected, decorative tile 400. Then, depending on the size of the decorative tile 400, it can serve as a commemorative plaque, as an anti dust and anti-moisture case, as a table-top, as floor tiles, or as wall paneling.

Figure 6:
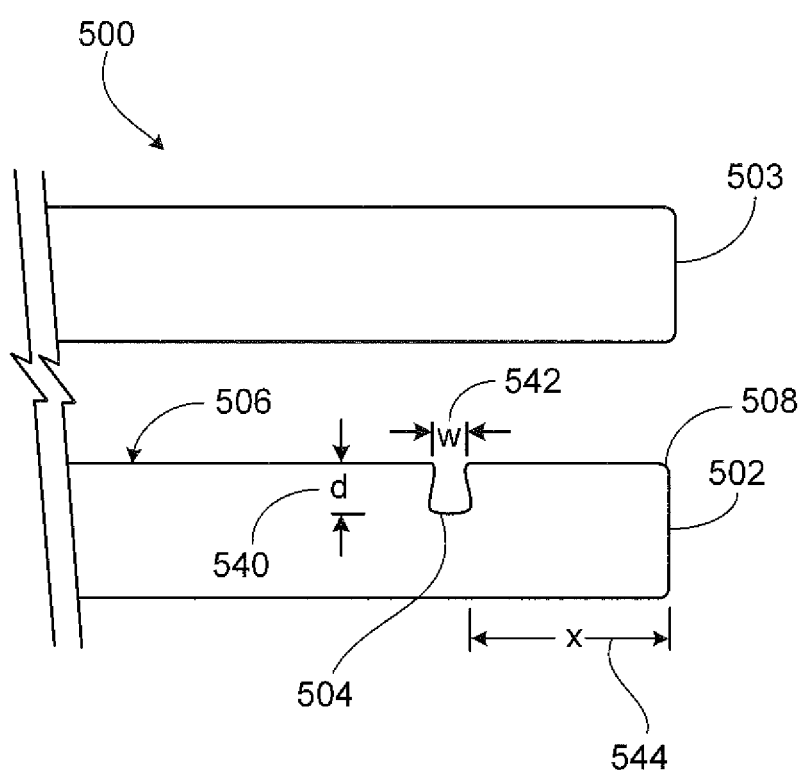
FIG. 6 is a partial cross-sectional view of a decorative tile.

FIG. 6 shows a cross-sectional view of a decorative tile 500 that is similar to the decorative tile 100 shown in FIG. 3. FIG. 6 shows some measurements used in making the decorative tile 500. For instance, in some implementations, the first groove 504 has a depth 540 between about 0.001 inches and 0.25 inches;
a width 542 between about 0.005 inches and 0.125 inches; and
a distance 544 between 0.015 inches and 4 inches away from the adjacent edge 508.

Figure 7A:
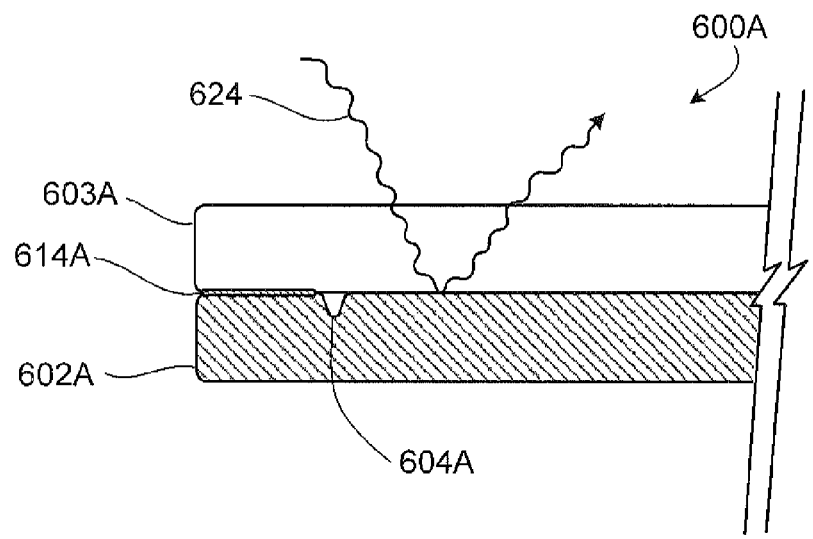
FIG. 7a is a cross-sectional view of a decorative tile with a first groove cut into a transparent sheet, which is adhered to an opaque sheet.
Figure 7B:
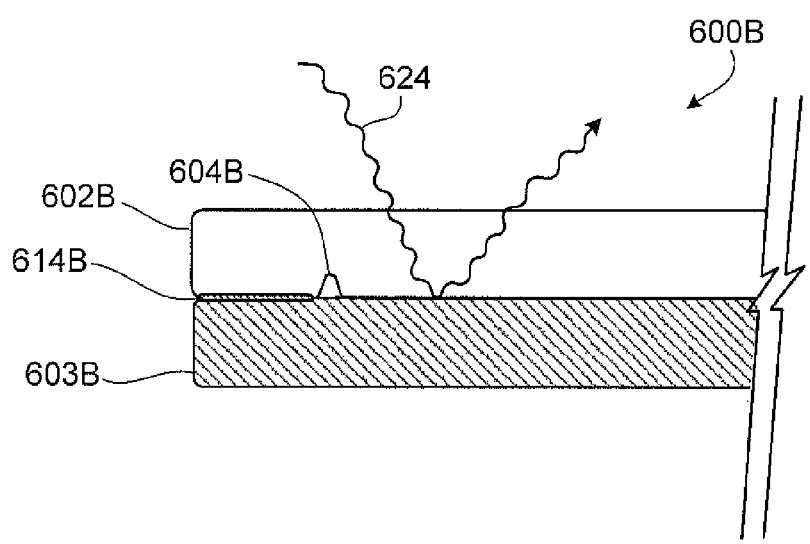
FIG. 7b is a partial cross-sectional view of a decorative tile with a first groove out into an opaque sheet, which is adhered to a transparent sheet.

FIG. 7 shows another cross-sectional view of decorative tiles 600A and 600B, each of which is similar to the decorative tile 100 shown in FIG. 3, with the following exceptions. The decorative tile 600A is made by providing a first sheet 602A that is opaque (i.e., not transparent but capable of reflecting light) and a second sheet 603A that is transparent. Then, the first sheet 602A and the second sheet 603A are adhered with the same process used to make the decorative tile 100. Unlike decorative tile 100, which allowed light 124 to pass through the first and second sheets 102, 103, the decorative tile 600A allows light 624 to pass through the second sheet 603A but not the first sheet 602A. Here, the light 624 is reflected by the first sheet 602A and passes through the second sheet 603A again at an incident angle.

Conversely, the decorative tile 600B is made by providing a first sheet 602B that is transparent and a second sheet 603B that is opaque. Then, the first sheet 602B and the second sheet 603B are adhered with the same process used to make the decorative tile 100. Unlike decorative tile 100, which allowed light 124 to pass through the first and second sheets 102, 103, the decorative tile 600B allows light 624 to pass through the first sheet 602B but not the second sheet 603B. Similarly, the light 624 is reflected by the second sheet 603B and passes through the first sheet 602B at an incident angle.

Figure 8A:
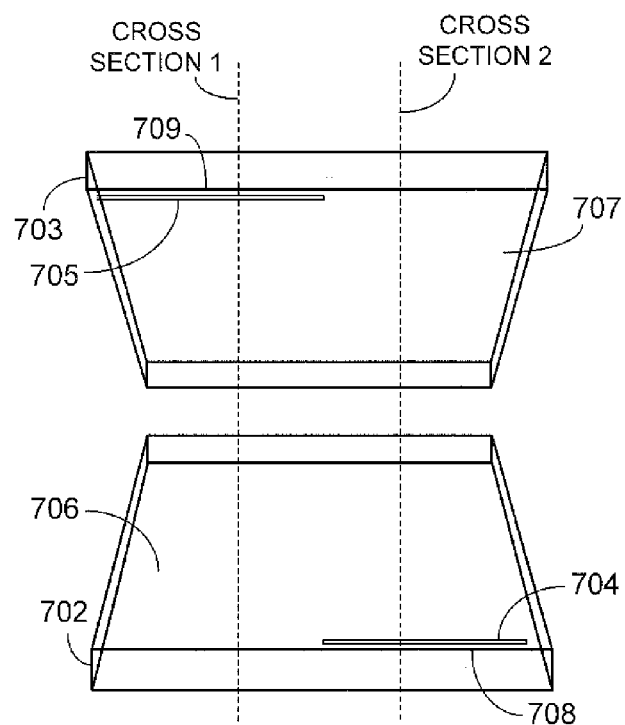
FIG. 8a is an exploded view of a decorative tile, wherein a first groove is formed on the first sheet and a second groove is formed on the second sheet.
Figure 8B:
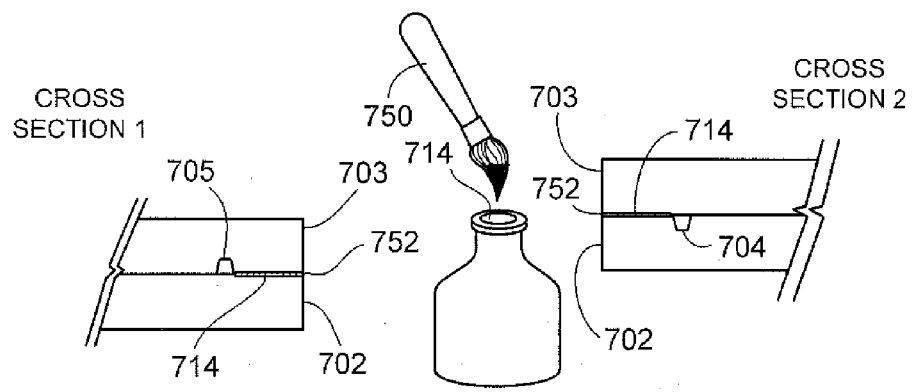
FIG. 8b includes two partial cross-sectional views of the decorative tile of FIG. 8a at two different locations indicated by dashed lines.
Figure 8C:
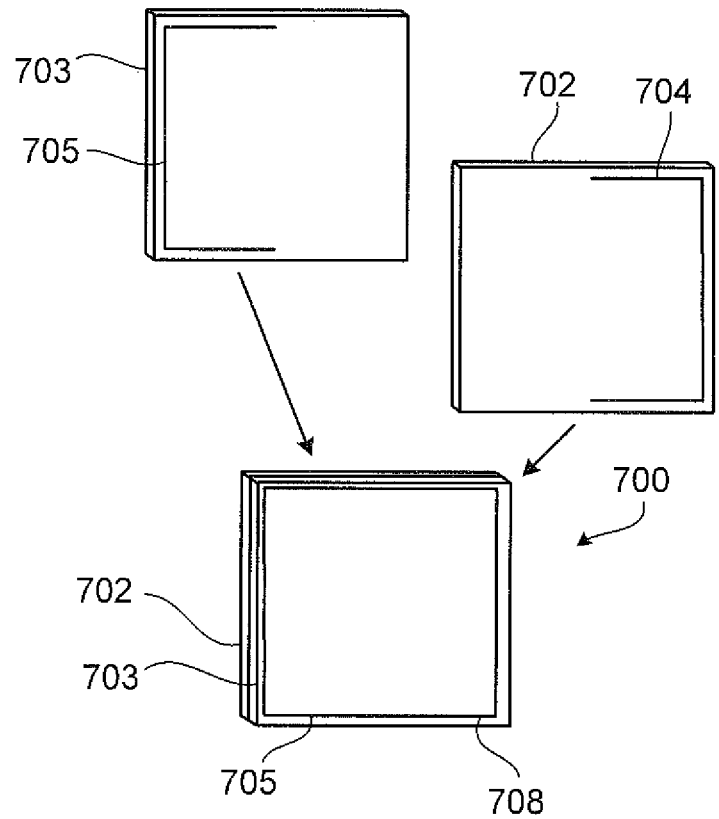

Turning now to FIG. 8a-8c, another implementation for manufacturing a decorative tile 700 is demonstrated. A first sheet 702 and a second sheet 703 are provided, each consisting of transparent acrylic, and each measuring 12 inches wide, 12 inches long, and 0.25 inches deep. Next, a first groove 704 is formed on the first surface 706 of the first sheet 702 using a water etcher, such as the Turbo Carver®. Here, the water etcher forms a first groove 704 that measures about 0.01 inches wide and 0.005 inches deep. The water etcher is manipulated so that the grove 704 is adjacent to an edge 708 of the first sheet 702, or approximately 0.015 inches from the edge 708. As shown in FIG. 8c, the water etcher is further manipulated so that the first groove 704 follows about 50% of the contours of the first surface 706 of the first sheet 702.

Then, a second groove 705 is formed on the first surface 707 of the second sheet 703 using the water etcher. The water etcher is manipulated to form a second groove 705 that measures about 0.01 inches wide and 0.005 inches deep. The water etcher is further manipulated so that the second grove 705 is adjacent to an edge 709 of the second sheet 703, or approximately 0.015 inches from the edge 709. Also shown, in FIG. 8c, the water etcher is further manipulated so that the second groove 705 follows about 50% of the contours of the first surface 707 of the second sheet 703.

In the next step, the first sheet 702 and the second sheet 703 are pressed together, forming a stack. FIG. 8c illustrates that, when viewed from above, the first groove 704 and the second groove 705 are aligned and appear to be a single groove when the first sheet 702 and the second sheet 703 are stacked.

Figure 8D:
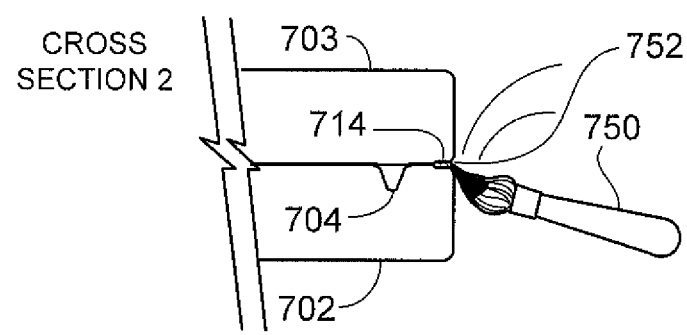

To apply the adhesive material 714, a brush 750 is dipped in methylene chloride adhesive material 714. Referring now to FIG. 8d, the brush 750 is swiped against the seam 752 of the first sheet 702 and second sheet 703. In this manner, the adhesive material 714 flows by capillary action into an area of the first surface 706 of the first sheet 702 along a length of the first groove 704 between the first groove 704 and the adjacent edge 708 of the first sheet 702.

As noted earlier, the adhesive material 714 does not spread past the first groove 704 because the first sheet 702 and the second sheet 703 stop touching at the first groove 704. Additionally, in this implementation, the adhesive material 714 does not spread past the second groove 705 for the same reason. Thus, even though the grooves 704, 705 are on opposite sheets 702, 703, together the grooves 704, 705 prevent the adhesive material 714 from spreading past the grooves 704, 705.

In some embodiments, the grooves 704, 705 substantially overlap. In this implementation, the water etcher is manipulated so that the first groove 704 is continuous or "closed." Likewise, the second groove 705 is also continuous. Next, the sheets 702, 703 are pressed together. Seen from atop in FIG. 8c, the stacked sheets 702, 703 would appear to have a single groove because the grooves 704, 705 are aligned and overlapping. In this example, each groove 704, 705 independently prevents the adhesive material 714 from spreading past the grooves 704, 705.

Figure 9A:
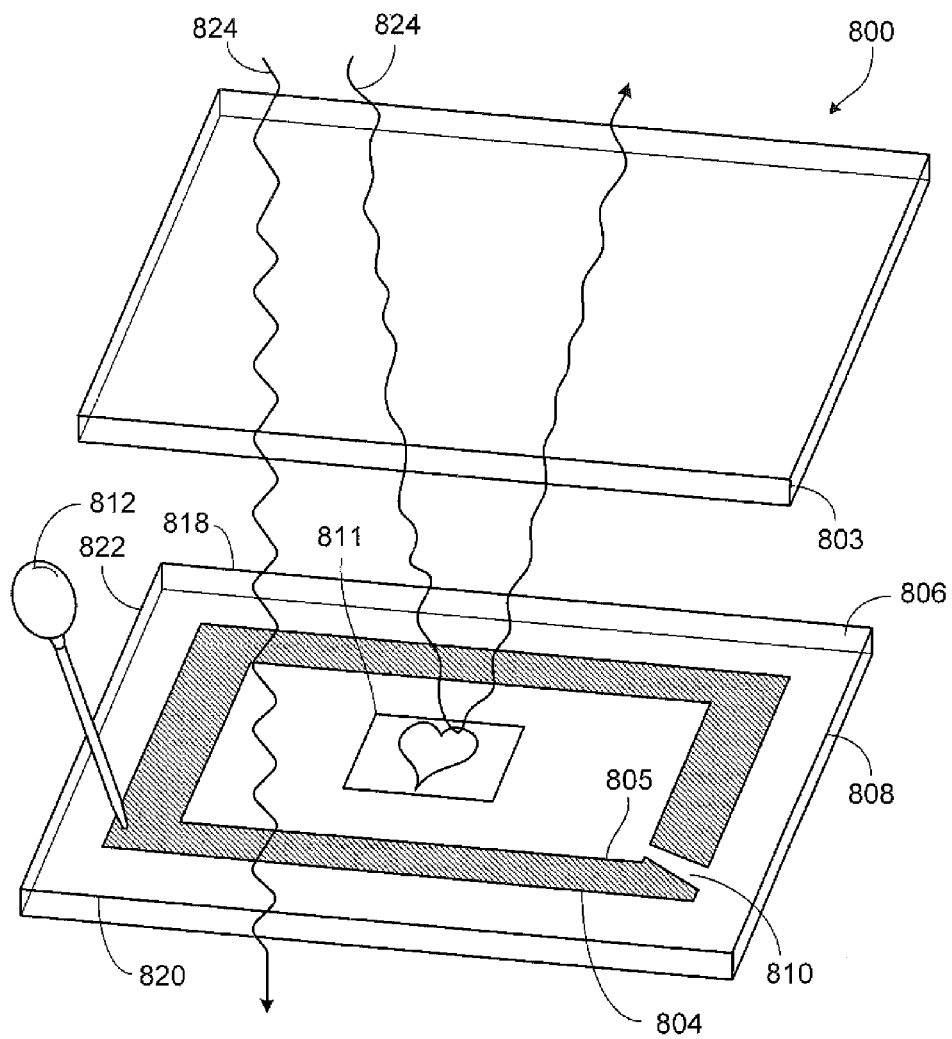
FIG. 9a is an exploded view of a decorative tile, wherein first and second grooves are formed on the first sheet, and an object is between the first and second sheets.

FIG. 9 illustrates another implementation for manufacturing a decorative tile 800. A first sheet 802 and a second sheet 803 are provided, each made of partially transparent glass (i.e., "frosted glass"), measuring 12 inches wide, 12 inches long, and 0.25 inches deep. Next, a first groove 804 is formed on the first surface 806 of the first sheet 802 using a sandblasting engraver, such as the ParaBlaster System™. The first groove 804 measures about 0.005 inches wide and 0.001 inches deep. The sandblasting engraver is manipulated so that the first wove 804 is adjacent to an edge 808 of the first sheet 802, or approximately 0.015 inches from the edge 808.

The sandblasting engraver is further manipulated so that the first groove 804 follows the contours of the first surface 806 of the first sheet 802, forming a non-continuous loop—indicated by the gap 810. The gap 810 measures about 0.01 inches.

Then, a second groove 805 is formed on the first surface 806 of the first sheet 802 using the sandblasting engraver. The second groove 805 measures about 0.005 inches wide and 0.001 inches deep. The sandblasting engraver is manipulated so that the second grove 805 is adjacent to the first groove 804, or approximately 0.015 inches from the first groove 804. The sandblasting engraver is further manipulated so that the second groove 805 follows the contours of the first groove 804, forming a second non-continuous loop—indicated by the gap 810. Consequently, in this implementation, the second groove 805 is about 0.03 inches away from the edges 808, 818, 820, and 822.

Next, an object 811—such as a picture of a heart—is placed on the first surface 806 of the first sheet 802. Using a syringe 812, the adhesive material 814—such as DYMAX Light Weld® 425 glass adhesive—is applied to an area of the first surface 806 of the first sheet 802 between the first groove 804 and the second groove 805.

Then, the second sheet 803 is pressed against the first sheet 802, and a DYMAX UV light is shined on the decorative tile 800. As the adhesive material 114 spreads between the first groove 804 and the second groove 805, the adhesive material cures and bonds the sheets 802, 803. Notably, the adhesive material 114 does not spread past the grooves 804, 805. In other words, the adhesive material 114 does not penetrate the area between the second groove 805 and the object 811, nor does the adhesive material 114 enter the area between the first groove 804 and the edges 808, 818, 820, and 822. As before, the gap 810 is of no consequence. This implementation is complete as soon as the adhesive material 814 cures.

The finished decorative tile 800 permits light 824 to pass through the sheets 802, 803. In this embodiment, the DYMAX Light Weld® 425 adhesive material 814 is transparent, allowing light 824 to pass through the area where the adhesive material 814 is applied (i.e., the area between the first groove 804 and the second groove 805). Further, in this implementation, the object 811 reflects light 824. However, in other embodiments, the object 811, may be colored and transparent to create aesthetically pleasing effects.

Figure 9B:
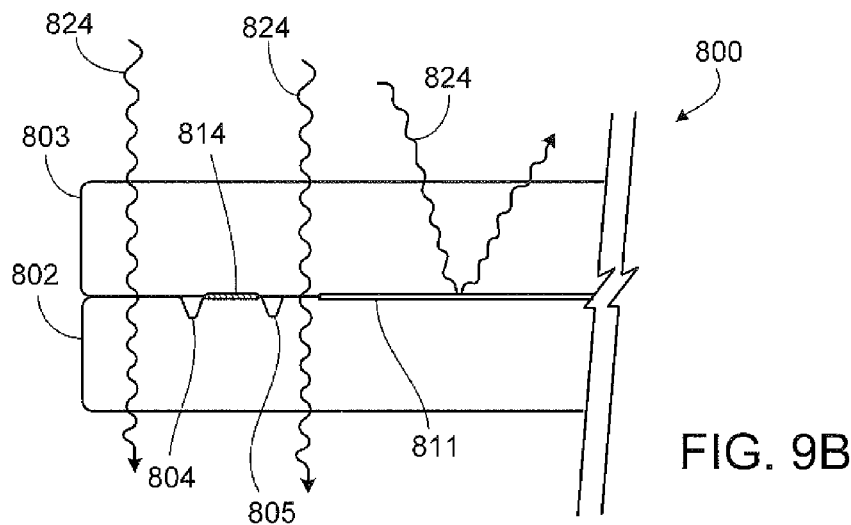
FIG. 9b is a partial cross-sectional view of a decorative tile that uses a first and second groove.

FIG. 9b shows a cross-sectional view of a completely assembled decorative tile 800. It includes a first sheet 802 and a second sheet 803 that is adhered to the first sheet 802. In this embodiment, both the sheets 802, 803 and the adhesive material 814 are transparent, creating three transparent portions. The first transparent portion is between the second groove 805 and the object 811. The second transparent portion is between the first groove 804 and the edges 808, 818, 820, and 822. The third transparent portion is between the grooves 804, 805. The decorative tile 800 includes a first groove 804 formed in the first surface 806 of the first sheet 802, in addition to a second groove 805 formed in the first surface 806 of the first sheet 802 adjacent to the first groove 804. Here, the second groove 804 is approximately 0.015 inches away from the first groove 804. The adhesive material 814 is between the first sheet 802 and second sheet 803 and between the first groove 804 and the second groove 805. The DYMAX Light Weld® 425 glass adhesive material 814 is substantially fluid when applied. Further, the grooves 804, 805 are dimensioned, such that with the substantially fluid adhesive material 814 applied and the sheets 802, 803 being pressed together, the grooves 804, 805 substantially prevent the adhesive material 814 from spreading past the first groove 804 or the second groove 805. In other words, no adhesive material 114 penetrates into the area between the second groove 805 and the object 811 nor the area between the first groove 804 and the edges 808, 818, 820, and 822. Moreover, the areas of the first surface 806 next to the grooves 804, 805 and at opposite sides of the grooves 804, 805 from the adhesive material 814 (i.e., the area between the second groove 805 and the object 811 and the area between the first groove 804 and the edges 808, 818, 820, and 822) are substantially visible through the first and second transparent portions. Additionally, in this example, the area between the grooves 804, 805 where the adhesive material 814 has been applied is substantially visible through the third transparent portion.

Figure 10:
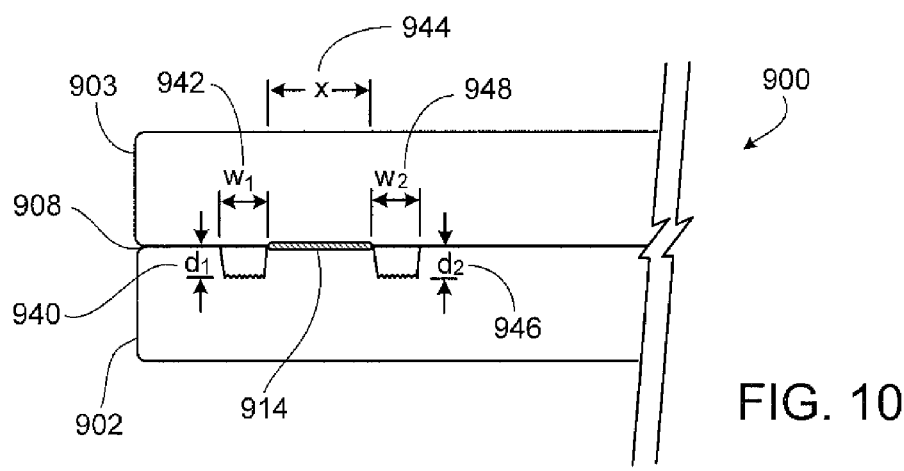
FIG. 10 is a partial cross-sectional view of a decorative tile that uses first and second grooves.

FIG. 10 shows a cross-sectional view of a decorative tile 900 that is similar to the decorative tile 800 shown in FIG. 9. FIG. 10 shows some measurements used in making the decorative tile 900. For instance, in some implementations, the first groove 904 has:

a depth 940 between about 0.001 inches and 0.25 inches; and a width 942 between about 0.005 inches and 0.125 inches.

Furthermore, in some implementations, the second groove 905 has:

a distance 944 that measures about 0.015 inches and 4 inches between the first groove 904 and the second groove 905;

a depth 946 between about 0.001 inches and 0.25 inches; and a width 948 between about 0.005 inches and 0.125 inches.

These measurements generally provide a sufficient area for the adhesive material 914 to form a strong bond between the sheets 902, 903.

Figure 11A:
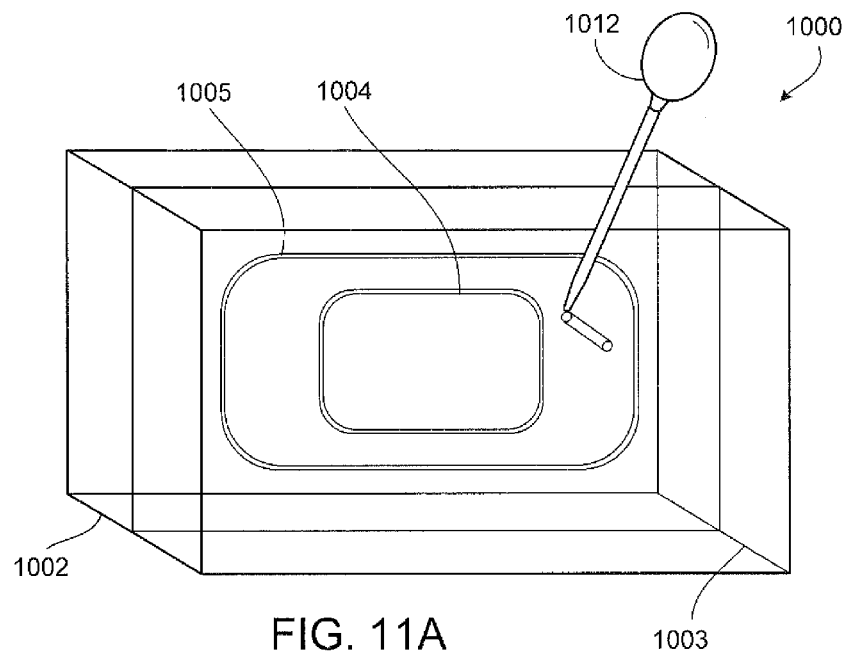
FIG. 11a is a perspective view of a decorative tile, with a hole cut through a first sheet so that adhesive material may be introduced to an area between first and second grooves.
Figure 11B:
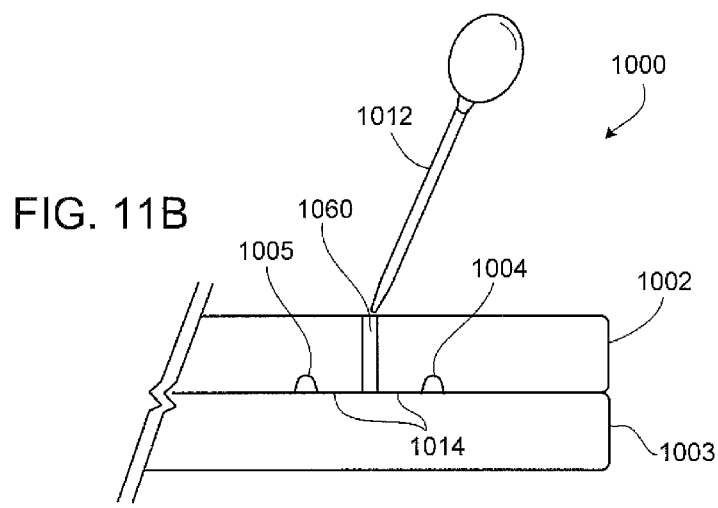

FIG. 11 shows a decorative tile 1000 that is substantially similar to the decorative tile 800 shown in FIG. 9. The primary difference is how the adhesive material 1014 is applied to the decorative tile 1000.

In one implementation for manufacturing the decorative tile 1000, the grooves 1004, 1005 are formed as described above and shown in FIG. 9. Note, however, that the grooves 1004, 1005 are continuous and there is no object 811 in this implementation. A hole 1060 is formed through the first sheet 1002, penetrating an area between the grooves 1004, 1005. Here, the hole 1060 is formed with a drill. Other implementations may use a laser cutter to form the hole 1060.

Next, the sheets 1002, 1003 are pressed together. Afterward, using a syringe 1012, the adhesive material 1014 is applied through the hole 1060 to an area between the first groove 1004 and the second groove 1005. A DYMAX UV light is shined on the decorative tile 1000. As the adhesive material 1014 spreads between the grooves 1004, 1005, the adhesive material 1014 cures and bonds the sheets 1002, 1003. As before, the adhesive material 1014 does not spread past the grooves 1004, 1005.

Figure 12:
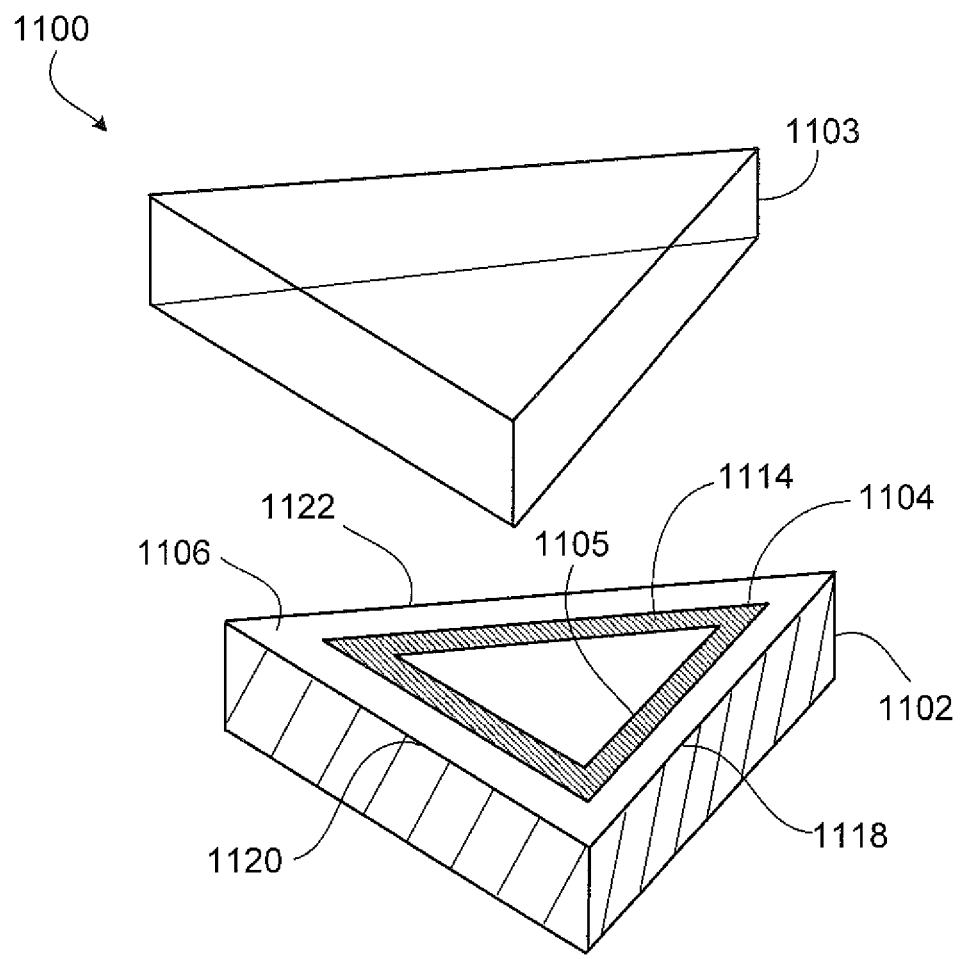
FIG. 12 is an exploded view of a decorative tile, with a first groove surrounding a second groove.

FIG. 12 shows a decorative tile 1100 that is similar to the decorative tile 800 shown in FIG. 9. Several differences are readily apparent in FIG. 12, though. For example, the first sheet 1102 and the second sheet 1103 are triangular, rather than rectangular. Thus, the grooves 1104, 1105 are formed to follow the contours of three edges, 1118, 1120, and 1122, rather than four edges, 808, 818, 820, and 822. Additionally, the decorative tile 1100 includes two grooves, 1104, 1105 that are continuous. In this manner, the first groove 1104 surrounds the second groove 1105. As shown in FIG. 12, there is no object 811 in this implementation of the decorative tile 1100. Otherwise, the decorative tile 1100 is made using the same process described above and shown in FIG. 9.

Figure 13:
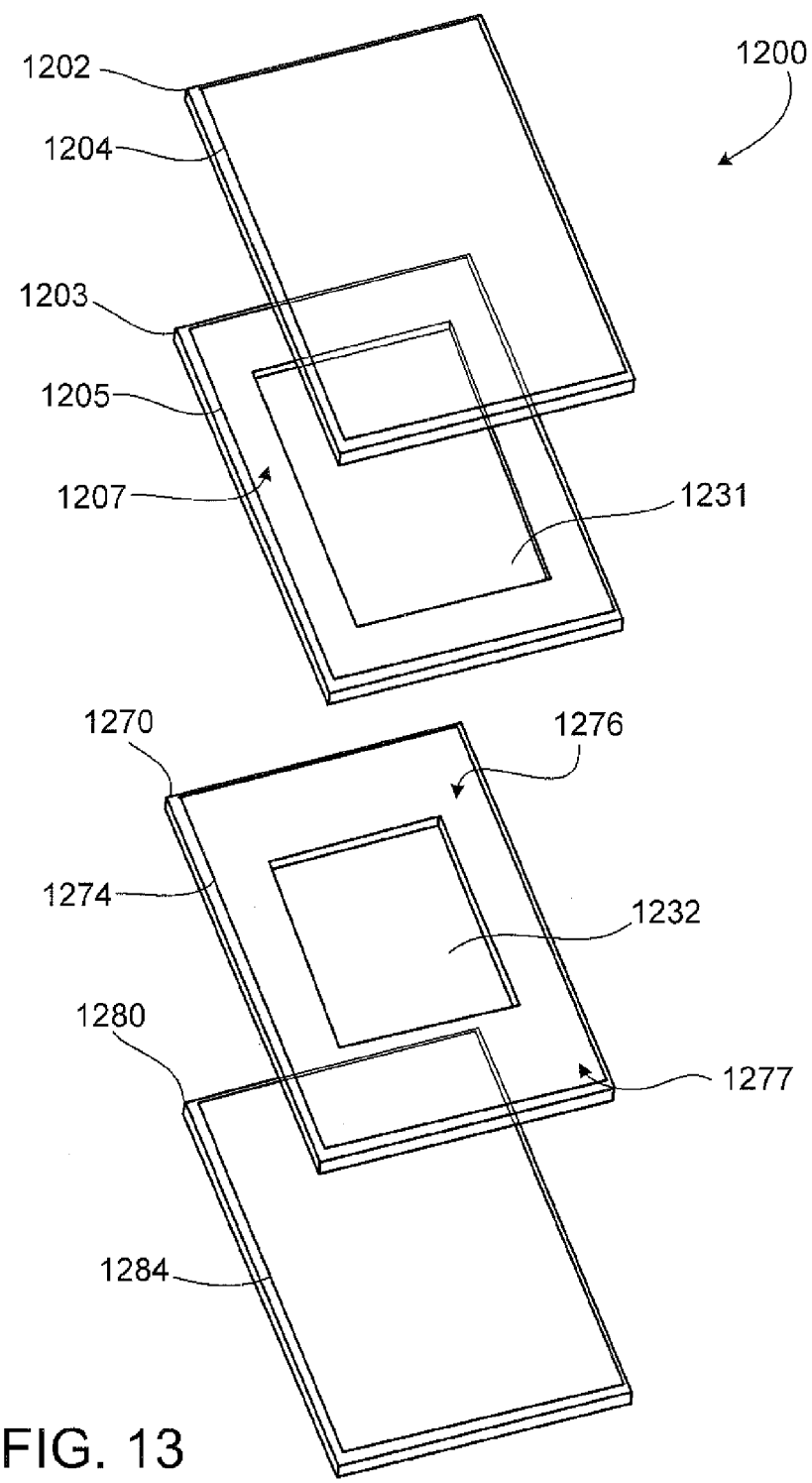
FIG. 13 is an exploded view of a stacked decorative tile with four sheets and a cavity.

FIG. 13 shows a stacked decorative tile 1200 using four sheets. In this implementation, the following are provided: a first sheet 1202 of transparent acrylic, a second sheet 1203 of translucent red acrylic, a third sheet 1270 of translucent blue acrylic, and a fourth sheet 1280 of mirrored acrylic. A first groove 1204 is formed on the first sheet 1202 in the same manner as the first sheet 102, except the first groove 1204 is continuous. A large square cutout 1231 is formed through the second sheet 1203. The adhesive material is applied to the first sheet 1202 in the same manner as the first sheet 102. The second sheet 1203 is pressed against the first sheet 1202 to adhere the first and second sheets 1202, 1203, and the first groove 1204 substantially prevents the adhesive material from spreading past the first groove 1204.

Next, a second groove 1205 is formed on the second surface 1207 (i.e., the bottom side) of the second sheet 1203 in the same manner as the first sheet 102, except the second groove 1205 is continuous. A cutout 1232 is formed through the third sheet 1270. Additionally, a third groove 1274 is formed on the first surface 1276 (i.e., the top side) of the third sheet 1270 in the same manner as the first sheet 102, except the third groove 1274 is continuous. The third groove 1274 is aligned with the second groove 1205. The adhesive material is applied to the second surface 1207 of the second sheet 1203 in the same manner as the first sheet 102. The third sheet 1270 is pressed against the second sheet 1203 to adhere the second and third sheets 1203, 1270, and the second and third grooves 1205, 1274 cooperate to substantially prevent the adhesive material from spreading past the second and third grooves 1205, 1274.

Then, a fourth groove 1284 is formed on the fourth sheet 1280 in the same manner as the first sheet 102, except the fourth groove 1284 is continuous. The adhesive material is applied to the fourth sheet 1280 in the same manner as the first sheet 102. The second surface 1277 (i.e., the bottom side) of the third sheet 1270 is pressed against the fourth sheet 1280 to adhere the third and fourth sheets 1270, 1280, and the fourth groove 1284 substantially prevents the adhesive material from spreading past the fourth groove 1284.

In this implementation, the stacked decorative tile 1200 has a tiered cavity formed by the cutouts 1231, 1232. Optionally, the stacked decorative tile 1200 may contain objects (i.e., ornamental elements) in the tiered cavity. Alternatively, the cutouts 1231, 1232 may be used to create a visually pleasing sense of depth within the decorative tile 1200.

Figure 14:
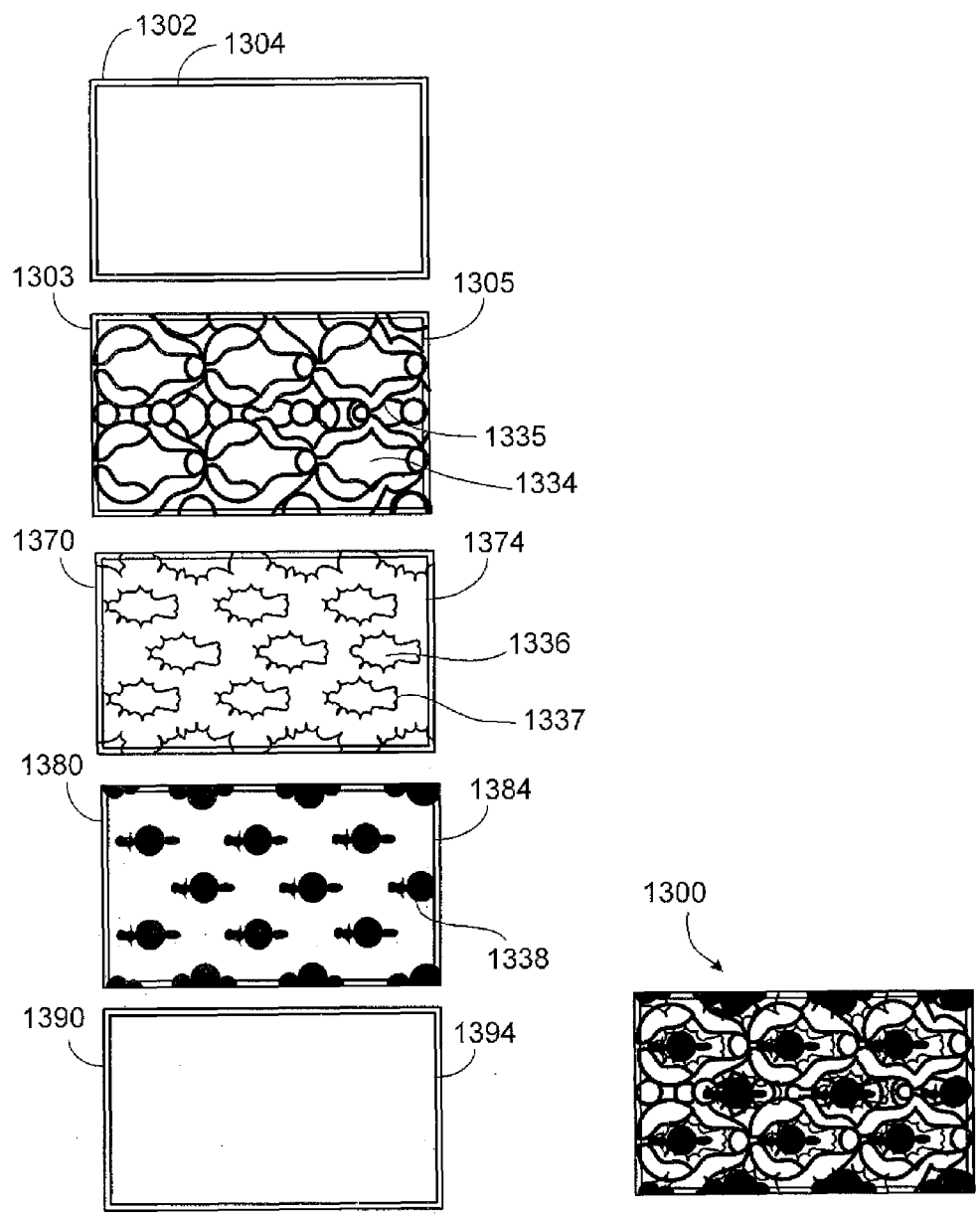
FIG. 14 is a top view of a stacked decorative tile using five sheets.

Another implementation of a decorative tile 1300 is demonstrated in FIG. 14. Here, the decorative tile 1300 is similar to the decorative tile 1200 with some exceptions. For instance, the decorative tile 1300 has five sheets instead of four. Thus, the following are provided: a first sheet 1302, a second sheet 1303, a third sheet 1370, a fourth sheet 1380, and a fifth sheet 1390. The five sheets 1302, 1303, 1370, 1380, and 1390, are made of transparent acrylic. In the same manner described for making decorative tile 1200, a first groove 1304 is formed on the first sheet 1302; a second groove 1305 is formed on the second sheet 1303; a third groove 1374 is formed on the third sheet 1370; a fourth groove 1384 is formed on the fourth sheet 1380; and a fifth groove 1394 is formed on the fifth sheet 1390.

Rather than forming a single, square cutout 1231 in the second sheet 1203, this implementation forms multiple, intricate cutouts 1334 with a first design 1335. Likewise, multiple cutouts 1336 are formed in the third sheet 1370 using a second design 1337. The fourth sheet 1380 is semi-etched (i.e., not cut through) with a third design 1338.

Using the process described to make the decorative tile 1200, the sheets 1302, 1303, 1370, 1380, and 1390, are stacked and adhered. This implementation creates a visually appealing sense of depth within the stacked decorative tile 1300.

Figure 15A:
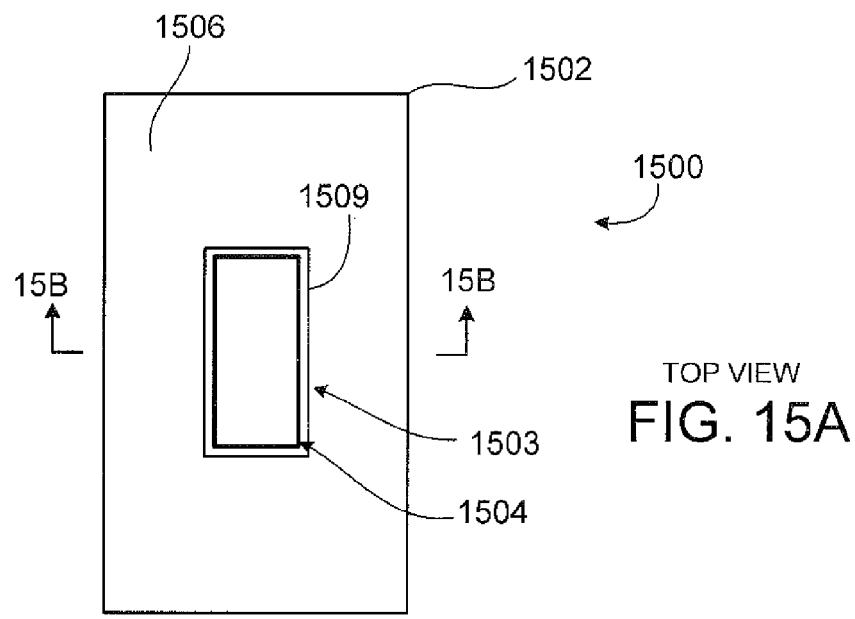
FIG. 15a is a top view of a decorative tile using different sized sheets.
Figure 15B:
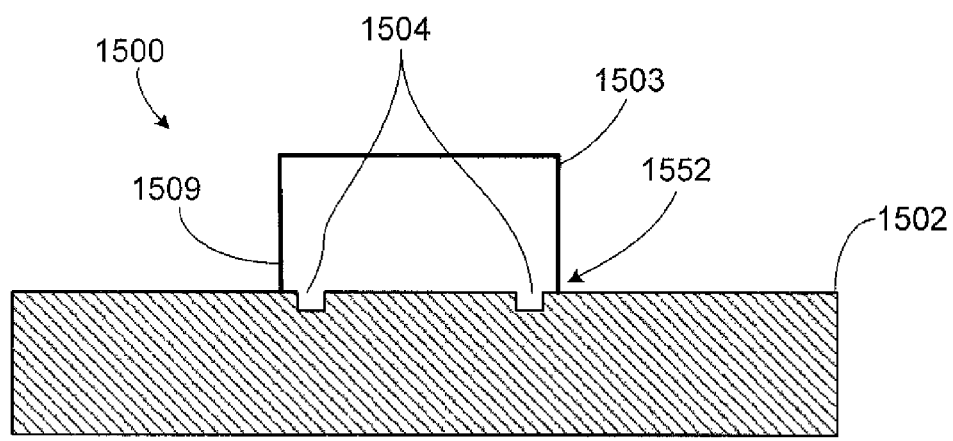

FIG. 15 shows a decorative tile 1500 using two sheets of different dimensions. A first sheet 1502 of opaque acrylic is provided, which measures 36 inches wide, 72 inches long, and 1 inch thick. A second sheet 1503 of transparent acrylic is provided, which measures 12 inches wide, 12 inches long, and 1 inch thick. A first groove 1504 is formed on the first sheet 1502 in the same manner as the first sheet 102, except the first groove 1504 is continuous. Additionally, in this implementation, the first groove 1504 is formed in a first surface 1506 of the first sheet 1502 so that when the second sheet 1503 is placed in contact with the first surface 1506 of the first sheet 1502, a side edge 1509 of the second sheet 1503 is adjacent to the first groove 1504.

Then, the second sheet 1503 is pressed against the first surface 1506 of the first sheet 1502. Using the technique illustrated in FIG. 1D, a brush dipped in adhesive materials is swiped against the seam 1552 to apply the adhesive material to an area of the first surface 1506 of the first sheet 1502 along a length of the first groove 1504 at a first side edge 1509 of the first groove 1504 to adhere the second sheet 1503 to the first sheet 1503.

As a result, the second sheet 1503 is adhered to the first sheet 1502, and the continuous groove 1504 prevents the adhesive material from spreading past the first groove 1504 when the second sheet 1503 is pressed against the first sheet 1502.

A number of implementations of the invention have been described. Nevertheless, it will be understood that various modifications may be made without departing from the spirit and scope of the invention.

For example, in another embodiment of the decorative tile 100 in FIG. 2, the adhesive material 114 is opaque, which blocks light 124 from passing through the area where the adhesive material 114 is applied. Nonetheless, light 124 passes through the area of the first surface 106 between the first groove 104 and the object 111.

In yet another embodiment of the decorative tile 100 in FIG. 2, the laser engraver is manipulated to form the first groove 104 such that it spans along 90% of the edge 108. For instance, in this embodiment, the first sheet 102 measures 10 inches wide, 10 inches long, and 1 inch deep. The first groove 104 would measure about 9 inches along each edge 108, 118, 120, and 122. In effect, this embodiment leaves 1 inch "margins" around the first groove 104 where the adhesive material 114 will be confined after it spreads and cures (the "adhesive area"). Additionally, the 1 inch margins provide a sufficient adhesive area so that the first sheet 102 and the second sheet 103 do not separate under deformation.

As noted earlier, some implementations are intended to create decorative tiles that can serve as wall paneling, which may require sheets 102, 103 measuring 4 feet wide, 8 feet long, and 1 inch deep. Materials like acrylic are increasingly flexible as the width and length increase relative to a fixed depth. Notably, if the adhesive area is too small, the sheets 102, 103 can separate due to deformation forces applied to the decorative tile 100, such as normal stress or shear stress. Thus, in one embodiment, the first groove 104 is further arranged sufficiently near an edge 108 of the first sheet 102 so as to provide a sufficient adhesive area so that the first sheet 102 and second sheets 103 do not substantially separate under deformation. For example, if the sheets 102, 103 measure 4 feet wide, 8 feet long, and 1 inch deep, it is expected that the first groove 104 may be placed about 4 inches from the edges 108, 118, 120, and 122.

In another embodiment of the decorative tile 100 in FIG. 2, the adhesive material does not have a substantial fluid consistency when it is applied to the area of the first surface. For instance, the applied adhesive material 114 may be a high viscosity epoxy resin that is manually spread across the first surface 106 of the first sheet 102.

In still another embodiment of the decorative tile 100 in FIG. 2, the adhesive material 114 is applied with a brush after the sheets 102, 103 are pressed together. In one implementation, the process is substantially similar to the one described with respect to applying the adhesive material 714 to the decorative tile 700 as shown in FIG. 8. However, in this embodiment, there is only one groove 104.

Referring now to FIG. 11, another embodiment of the decorative tile 1000 includes non-continuous grooves 1004, 1005 and objects placed between the sheets 1002, 1003.

In other embodiments, the methods illustrated in FIGS. 2-4 and FIG. 11 are combined. The combination may be for aesthetic effect or simply to provide another adhesive area for the sheets. One implementation of this combination has three grooves, forming two adhesive areas. The first adhesive area is between the first groove and an edge. The second adhesive area is between the second and third grooves. The three grooves are formed using the process described to make the decorative tile 100 and shown in FIG. 2-4. Then, a hole is formed through the first sheet and between the second and third grooves, as described with respect to the decorative tile 1000 shown in FIG. 11. The sheets are pressed together. Then, to apply the adhesive material to the first adhesive area, a brush dipped in methylene chloride is swiped against the seam of the sheets. To apply the adhesive material to the second adhesive area, the methylene chloride is injected into the hole using a syringe. As a result, the adhesive material is confined to the first and second adhesive areas and the sheets are adhered.

In one implementation, a transparent third sheet is provided in addition to the decorative tile 100 illustrated in FIGS. 2-4. A first groove is formed on the third sheet in the same manner as the first sheet 102. The adhesive material is applied to the third sheet in the same manner as the first sheet 102. Then the top of the decorative tile 100 is pressed against the third sheet to adhere the second sheet 103 to the third sheet.

In yet another implementation of the decorative tile 100 shown in FIGS. 2-4, the gap 110 measures about 0.02 inches. When the second sheet 103 is pressed against the first sheet 102, the adhesive material 114 penetrates the first groove 104 near the gap 110 by about 0.125 inches. Thus, despite the gap 110, the first groove 104 substantially prevents the adhesive material 114 from spreading past the first groove 104 when the second sheet 103 is pressed against the first sheet 102.

In another embodiment of the decorative tile 100 shown in FIGS. 2-4, only a portion of the second sheet 103 is transparent. In one implementation, the second sheet 103 has an opaque fleur-de-lis design on the second surface of the second sheet 103. When the sheets 102, 103 are adhered, the decorative tile 100 is substantially visible through on or more of the transparent portions wherever the opaque fleur-de-lis design fails to block light).

Throughout the description, various materials were chosen to manufacture the decorative tiles. It is understood that several materials are suitable, including: acrylic, glass, plastic and vinyl. These materials share the following properties: they are engravable, they are adherable, and, optionally, they can be transparent.

Likewise, various methods were described for engraving the decorative tiles. Several processes are suitable, including: laser engraving, sandblasting, diamond etching, water etching, chemical etching and chiseling. The etching process is chosen to best suit the selected material. In some embodiments, a laser engraver is used because it is precise and programmable.

Other implementations are within the scope of the claims.

What is claimed is:

1. A decorative tile, comprising:
   a first sheet;
   a second sheet adhered to the first sheet, wherein the first sheet or the second sheet has a portion that is transparent;
   a first groove formed in a first surface of the first sheet;
   a second groove formed in the first surface of the first sheet adjacent to the first groove;
   an adhesive material between the first and second sheets and between the first and second grooves, wherein the adhesive material is a material that, when applied, has a substantially fluid consistency,
   and
   wherein the first and second grooves are dimensioned, such that, with the substantially fluid adhesive material applied and the first and second sheets being pressed together, the first and second grooves substantially prevent the adhesive material from spreading past the first or second grooves,
   wherein areas of the first surface next to the first and second grooves and at opposite sides of the first and second groove from the adhesive material are substantially visible through one or more of the transparent portions; and
   an object between the first and second sheets at a location such that the object is visible through one or more of the transparent portions,
   wherein the object is placed in a cavity formed in at least a first surface of the first sheet or in a surface of the second sheet pressed against a first surface of first sheet.

2. The decorative tile of claim 1 wherein the first groove surrounds the second groove.

* * * * *